US012743453B2

(12) United States Patent
Kunz

(10) Patent No.: US 12,743,453 B2
(45) Date of Patent: Sep. 22, 2026

(54) MULTI-ROUND REPRESENTATION BUILDER FOR LARGE LANGUAGE MODEL

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 19/007,844

(22) Filed: Jan. 2, 2025

(65) Prior Publication Data

US 2026/0187114 A1 Jul. 2, 2026

(51) Int. Cl.
*G06F 16/3329* (2025.01)
*G06F 16/383* (2019.01)

(52) U.S. Cl.
CPC ...... *G06F 16/33295* (2025.01); *G06F 16/383* (2019.01)

(58) Field of Classification Search
CPC ......................... G06F 16/33295; G06F 16/383
USPC .............................................................. 704/9
See application file for complete search history.

(56) References Cited

U.S. PATENT DOCUMENTS

| | | | | |
|---|---|---|---|---|
| 11,971,914 | B1 * | 4/2024 | Watson | G06F 16/31 |
| 12,353,469 | B1 * | 7/2025 | Mahabadi | G06F 16/332 |
| 12,556,533 | B1 * | 2/2026 | Gu | H04L 63/083 |
| 2024/0303263 | A1 * | 9/2024 | Ojha | G06F 16/335 |
| 2024/0354436 | A1 * | 10/2024 | Mukherjee | G06F 21/6227 |
| 2024/0370658 | A1 * | 11/2024 | Zhang | G06F 40/242 |
| 2024/0386103 | A1 * | 11/2024 | Clement | G06F 21/56 |
| 2024/0394285 | A1 * | 11/2024 | Cunningham | G06F 16/3329 |
| 2025/0086245 | A1 * | 3/2025 | Korsak | G06F 16/355 |
| 2025/0110753 | A1 * | 4/2025 | Beil | G06F 16/33295 |
| 2025/0111167 | A1 * | 4/2025 | McIntyre | G06F 16/383 |
| 2025/0117406 | A1 * | 4/2025 | Jalagam | G06F 16/24554 |
| 2025/0117595 | A1 * | 4/2025 | Taheri | G06F 40/40 |
| 2025/0117596 | A1 * | 4/2025 | Taheri | G06N 20/00 |
| 2025/0117630 | A1 * | 4/2025 | Taheri | G06N 3/0895 |
| 2025/0117769 | A1 * | 4/2025 | Taheri | G06F 40/20 |
| 2025/0133037 | A1 * | 4/2025 | Jensen | G06N 3/0475 |
| 2025/0181641 | A1 * | 6/2025 | Debnath | G06F 16/7867 |
| 2025/0210033 | A1 * | 6/2025 | Sharifi | G06F 16/33295 |
| 2025/0225176 | A1 * | 7/2025 | Guda | G06F 16/532 |
| 2025/0225330 | A1 * | 7/2025 | Rath | G06F 16/3347 |
| 2025/0252124 | A1 * | 8/2025 | Aviyam | G06F 16/3329 |
| 2025/0258998 | A1 * | 8/2025 | Villa | G06N 3/08 |
| 2025/0265446 | A1 * | 8/2025 | Crume | G06N 3/045 |
| 2025/0272577 | A1 * | 8/2025 | Thompson | G06F 16/33295 |
| 2025/0278423 | A1 * | 9/2025 | Bierner | G06F 16/3332 |

(Continued)

*Primary Examiner* — Thuykhanh Le
(74) *Attorney, Agent, or Firm* — SCHWEGMAN LUNDBERG & WOESSNER, P.A.

(57) ABSTRACT

In an example embodiment, rather than use large language model (LLM) to directly generate desired computer code, an intermediate representation is generated by the LLM. The LLM is used to generate the portion of the computer code that cannot be computed programmatically (which may be called the "creative" part for purposes of the present disclosure). The intermediate representation can then be fed into a separate programmatic component that compiles the intermediate representation into compilable computer code. This fine-tuning may involve, for example, sanitizing the intermediate representation, enhancing the intermediate representation, and formatting the intermediate file, as well as modifying the intermediate representation based on a feature set.

20 Claims, 4 Drawing Sheets

(56) References Cited

U.S. PATENT DOCUMENTS

| | | | | |
|---|---|---|---|---|
| 2025/0284706 | A1* | 9/2025 | Smith | G06F 16/258 |
| 2025/0299053 | A1* | 9/2025 | Cuomo | G06N 3/091 |
| 2025/0335795 | A1* | 10/2025 | Gupta | G06N 5/04 |
| 2025/0337771 | A1* | 10/2025 | Mantin | H04L 63/1483 |
| 2025/0342182 | A1* | 11/2025 | Nabel | A63F 13/40 |
| 2025/0370731 | A1* | 12/2025 | Agarwal | G06F 16/33295 |
| 2025/0371133 | A1* | 12/2025 | Mantin | G06F 21/54 |
| 2025/0373575 | A1* | 12/2025 | Maheshwari | G06F 16/243 |
| 2025/0384330 | A1* | 12/2025 | Riscutia | G06N 20/00 |
| 2025/0390879 | A1* | 12/2025 | Marcus | G06Q 20/4016 |
| 2026/0010642 | A1* | 1/2026 | Roper, Jr. | G06F 21/577 |
| 2026/0010762 | A1* | 1/2026 | Mohajer | G06F 16/90332 |
| 2026/0023579 | A1* | 1/2026 | Khalid | G06F 9/451 |
| 2026/0023772 | A1* | 1/2026 | Wang | G06F 16/337 |
| 2026/0030455 | A1* | 1/2026 | Kang | G06F 40/40 |
| 2026/0037559 | A1* | 2/2026 | Stirling | G06F 16/2456 |
| 2026/0044556 | A1* | 2/2026 | Gordon | G06F 16/383 |
| 2026/0050616 | A1* | 2/2026 | Wang | G06N 20/00 |
| 2026/0057254 | A1* | 2/2026 | Shastri | G06F 16/33295 |
| 2026/0064986 | A1* | 3/2026 | Tran | G06F 40/40 |
| 2026/0064987 | A1* | 3/2026 | Nguyen | G06F 40/40 |
| 2026/0067113 | A1* | 3/2026 | Brenna | G06F 16/33295 |
| 2026/0067335 | A1* | 3/2026 | Tran | G06F 21/6245 |
| 2026/0087044 | A1* | 3/2026 | Sislow | G06F 16/33295 |
| 2026/0093738 | A1* | 4/2026 | Bertizzolo | G06F 16/33295 |
| 2026/0099678 | A1* | 4/2026 | Ramnath | G06F 40/40 |
| 2026/0105082 | A1* | 4/2026 | Xie | G06F 16/3329 |
| 2026/0105118 | A1* | 4/2026 | Lim | G06F 3/04842 |
| 2026/0111470 | A1* | 4/2026 | Liu | G06F 16/3329 |
| 2026/0134212 | A1* | 5/2026 | Yuan | G06F 16/33295 |
| 2026/0154374 | A1* | 6/2026 | Spall | G06F 18/2113 |
| 2026/0161686 | A1* | 6/2026 | Dhillon | G06F 16/33295 |
| 2026/0162012 | A1* | 6/2026 | Moon | G06N 20/00 |
| 2026/0169916 | A1* | 6/2026 | Das | G06F 12/0802 |
| 2026/0178014 | A1* | 6/2026 | Ando | G05B 19/41865 |
| 2026/0178668 | A1* | 6/2026 | Li | G06F 16/90332 |
| 2026/0178924 | A1* | 6/2026 | Tensmeyer | G06N 3/091 |

* cited by examiner

SCHEMA 106

METADATA 108

PROGRAM 102

INTERMEDIATE REPRESENTATION GENERATION COMPONENT 104

FINAL REPRESENTATION 124

PROGRAMMATIC COMPONENT 122

INTERMEDIATE REPRESENTATION 120

PROMPT

QUESTION(S)

PROMPT

QUESTION(S)

REPRESENTATION PROMPT

LLM 110

QUESTION(S)

ANSWER(S)

USER INTERFACE 116

USER INTERFACE FUNCTION 114

QUESTION(S)

RESPONSE HANDLING COMPONENT 118

ANSWER(S)

QUESTION(S)

ANSWER(S)

USER 112

MULTI-ROUND REPRESENTATION BUILDER FOR LARGE LANGUAGE MODEL

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
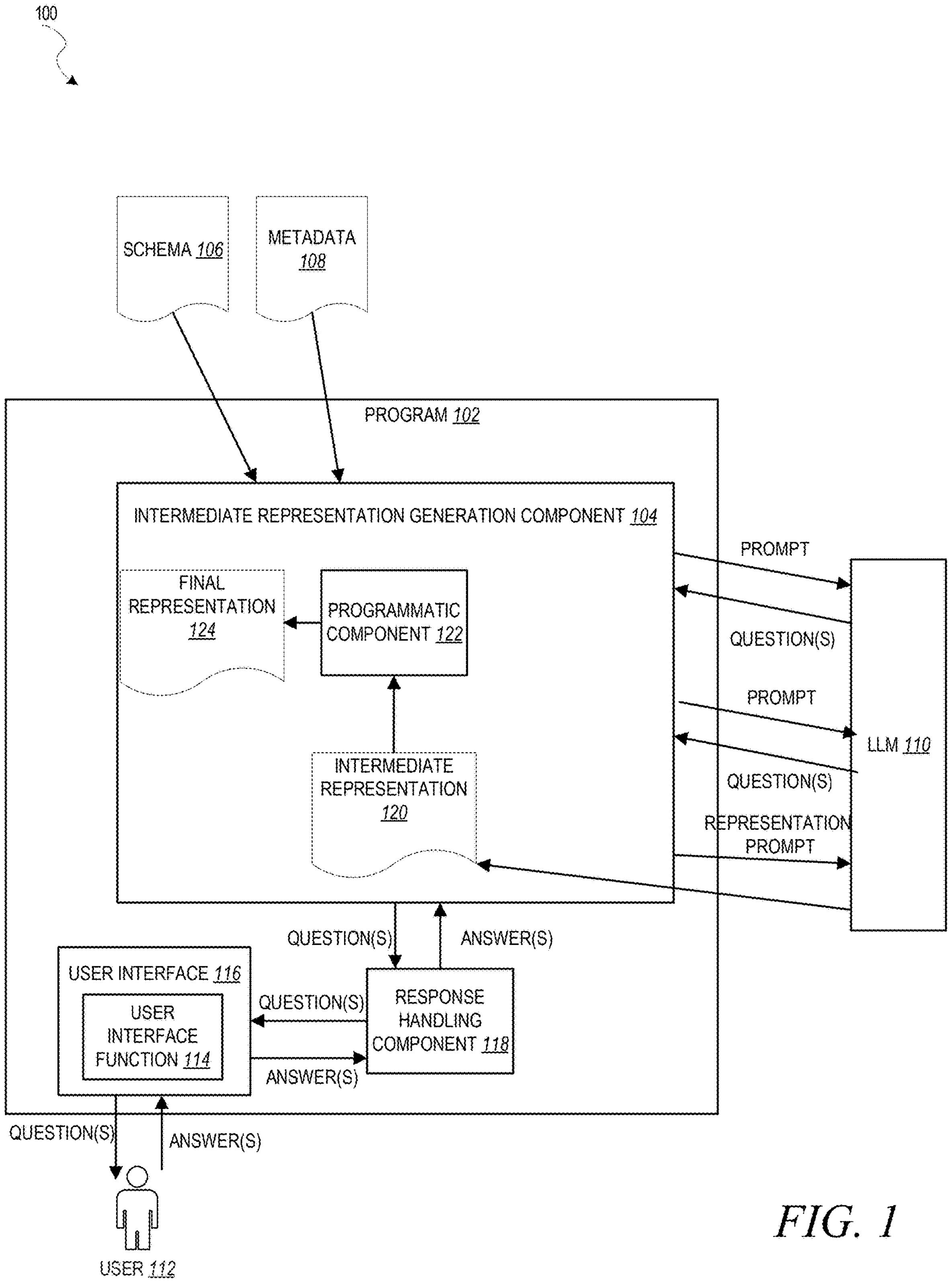
FIG. 1 is a block diagram illustrating a system for automatically generating a CDS model object from natural language text, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

LLMs are highly capable of generating text and even computer code (to be compiled into running software). LLMs, however, are limited due to the fact that their existing knowledge is limited by their training data. The result is that the output is not always correct. There are ways to reduce the impact of this limitation, such as by crafting appropriate system messages, adding external data through generated function invocations, or fine-tuning the foundation models, but these solutions are not perfect and still result in erroneous output. These limitations are amplified when the LLM is outputting compilable computer code, where it is not only important that the substance of the output be correct but also that the syntax and formatting be correct.

Indeed, certain types of compilable computer code may be even more difficult for an LLM to generate correctly, due to a number of factors, such as the compilable computer code type being one that is proprietary or at least partially proprietary (and thus in a format that is difficult to train an LLM on), and the compilable computer code type being one that is difficult to change once it is generated.

One solution would be to, rather than use an LLM to directly generate desired computer code, generate an intermediate representation by the LLM. Here the LLM would be used to generate the portion of the computer code that cannot be computed programmatically (which may be called the "creative" part for purposes of the present disclosure). The intermediate representation can then be fed into a separate programmatic component that compiles the intermediate representation into compilable computer code. This compiling may involve, for example, sanitizing the intermediate representation, enhancing the intermediate representation, and formatting the intermediate file, as well as modifying the intermediate representation based on a feature set.

The programmatic component does not learn from data and is not influenced by machine learning techniques. Typically, a programmatic component consists of algorithms designed and coded manually by humans, relying on human expertise and knowledge to solve specific problems.

In contrast, the LLM is designed to learn patterns and relationships from data, allowing them to improve their performance over time. LLMs differ from programmatic components in that they can adapt and optimize based on the data they are exposed to.

A technical issue, however, arises with this approach. Specifically, applications that use LLMs are often perceived as black boxes, as it is unclear what input is expected and what the possible outcome is. The degrees of freedom are hidden from the user. More specifically, in the intermediate representation solution, the end user does not see the schema of the intermediate representation and therefore does not know its degrees of freedom. This means that the user does not know what the user can influence.

In an example embodiment, a multi-round intermediate representation builder is provided where the LLM is instructed to actively ask for more information based on a schema and metadata of the schema. This allows the end user to switch from a purely active role, where the user instructs the LLM precisely on what to generate, to a more passive role, where the user answers questions generated by the LLM based on the schema and the metadata. The metadata of the schema can encode information about the priority of the information (e.g., how important it is, an order number specifying in what order certain information is asked about, provide groupings where several pieces of information can be grouped into one logical unit, provide hints on how to asks about the information (e.g., providing a list of possible answers), and provide other information.

Furthermore, in some example embodiments, is specific information is requested, the LLM can not just generate the question, but generate a function invocation that the host program can execute. Thus, for example, the LLM can instruct the host program to launch a user interface with a drop-down menu providing choices for the user to select from. These choices may be derived from the schema.

In additional example embodiments, the schema metadata can also include information about the questioning itself, such as that specific information should only be requested in special cases.

In some additional embodiments, metadata about the schema can also be requested by the LLM on demand, such as by using retrieval augmented generation (RAG). RAG is a framework that combines traditional retrieval techniques with generative models to improve the quality of generated responses, particularly in tasks like question answering or conversational agents. In RAG, the process typically involves two main steps:

- Retrieval: The system first retrieves relevant documents or pieces of information from a large database or knowledge base based on the input query. This can be performed using techniques like search algorithms or vector embeddings to find the most pertinent information.
- Generation: After retrieving relevant information, a generative model (like an LLM) processes this data to produce a coherent and contextually appropriate response. The model can leverage the retrieved content to enhance its answers, making them more accurate and informative.

The combination allows the model to provide richer, more context-aware responses than it could generate from scratch, tapping into a larger body of knowledge while still being able to generate natural language. RAG is particularly useful in scenarios where real-time access to up-to-date information is critical.

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. An example cloud platform includes SAP Cloud Application Platform (CAP), from SAP SE of Walldorf, Germany. A cloud platform may run a data model infrastructure, where data models can be created and run.

One example of such a data model infrastructure is Core Data Services (CDS) from SAP SE of Walldorf, Germany. CDS enables service definitions and data models to be declaratively captured in plain object notations. CDS models are typically written in CDS language and then compiled. In an example embodiment, the aforementioned techniques are used to generate a CDS model (which is compliable computer code) by first using an LLM to generate an intermediate representation, such as a JavaScript Object Notation (JSON) file or a Extensible Markup Language (XML) file, and then passing the intermediate representation through a programmatic component to generate the final CDS computer code.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance. The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

FIG. 1 is a block diagram illustrating a system 100 for automatically generating a CDS model object from natural language text, in accordance with an example embodiment. Here, a program 102 contains an intermediate representation generation component 104 that accesses a schema 106 and metadata 108 about the schema. It should be noted that while here the schema 106 and metadata 108 are depicted as separate documents, in some example embodiments they may constitute one document, essentially a schema that has been enhanced with metadata.

The intermediate representation generation component 104 then sends a prompt (along with the schema 106 and metadata 108) to an LLM 110 requesting that the LLM 110 generate one or more questions for the user 112 to answer to clarify the user's needs. The LLM 110 then generates a response, based on the prompt, the schema 106, and the metadata 108 that it returns to the intermediate generation component 104. This response can include one or more questions for the user 112 but also can include other information, such as a function call to a user interface function 114 within a user interface 116.

The following is an example prompt in accordance with an example embodiment:

Given the following JSON schema which also includes additional metadata on how to ask questions and the current (potentially incomplete) JSON result, your job is to generate questions to make sure that the JSON result has all the information as it is required by the JSON schema.

The metadata contains:

'priority': You must ask questions to fill the content with the highest priority first, only then you ask other questions.

'question_group': Ask the questions in a way that all the information belonging to a given question_group is asked in a single question 'answer_select': The value of this property is a JSON path. If you encounter such metadata, generate a code block next to the question, which has the shape '''code
Multiple_selection(<JSON path>)
'''

The intermediate representation generation component 104 passes the response to a response handling component 118 that handles the response. This handling may include presenting the one or more questions to the user 112, either via user interface 116 or via the user interface function 114 (or both). This causes the one or more questions to be asked to the user 112, who then may respond with one or more answers. The user interface 116 presents these one or more answers to the intermediate representation generation component 104, which the intermediate representation generation component 104 then can determine whether enough information has been obtained from the user to properly instruct the LLM 110 on how to generate an intermediate representation 120. If it determines that there is not yet enough information, then it may repeat the requesting of the LLM 110 to generate one or more additional questions for the user 112 to help provide that additional information. This may include sending another prompt to the LLM (along with the schema 106, the metadata 108, and whatever answers the user 112 has already provided), requesting that the LLM 110 generate one or more questions for the user 112 to answer to clarify the user's needs. The LLM 110 then generates a response, based on the prompt, the schema 106, the metadata 108, and the previous answers from the user 112) that it returns to the intermediate generation component 104. Again, this response can include one or more questions for the user 112 but also can include other information, such as a function call to a user interface function 114 within a user interface 116, and it can be handled in the same way as was the previous response.

This process continues to loop with requesting the LLM 110 generate more questions and the user providing more answers until the intermediate representation generation component 104 determines enough information has been obtained from the user to properly instruct the LLM 110 on how to generate an intermediate representation 120.

This determination may be based on the schema 106 and metadata 108 itself. Specifically, the metadata may indicate what types of questions need to be asked and in what order. Once all of those questions have been answered by the user 112, then this may indicate that enough information has been obtained from the user to properly instruct the LLM 110 on how to generate an intermediate representation 120. In some example embodiments, however, it is the LLM 110 that determines that no further information is needed to be generated.

As mentioned earlier, the metadata 108 may include special cases where questions may or may not need to be asked. Some questions, for example, may be optional. In other instances, certain question "paths" may be provided by making some questions dependent on the answers to previous questions, and the user's response to earlier questions may prompt other questions to either be asked or not asked. For example, the metadata 108 may indicate that a user should be asked which of the provided entities should be shown on a user interface.

Nevertheless, once the determination has been made that enough information has been obtained from the user to properly instruct the LLM 110 on how to generate an intermediate representation 120, the intermediate representation generation component 104 generates a representation prompt including all of the answers from the user 112 and sends it to the LLM 110. The prompt includes a system message, which generally instructs the LLM to generate the creative portions of the desired CDS computer code (the portions that will not or cannot be generated programmatically). In an example embodiment, the system message instructs the LLM 110 to generate an intermediate representation 120 in a particular protocol, such as JSON. Upon receipt of this intermediate representation 120, a programmatic component 122 performs one or more programmatic functions on the intermediate representation 120 and converts it to a final representation 124, which is compilable computer code (here being a CDS model).

In an example embodiment, the programmatic component 122 is designed to allow for minimal degrees of freedom in the intermediate representation 120. Degrees of freedom in this context means the number of independent ways the LLM 110 can generate the intermediate representation 120 without impeding any of the constraints placed upon it. Degrees of freedom can also be thought of as the number of independent variables/parameters in a calculation performed by a machine learning model, such as an LLM. Thus, in this case it is desirable for the programmatic component 122 to be created in such a way that it is making as many of the "choices" that the LLM 110 would otherwise make in the code generation process as possible, reducing the number of variables the LLM 110 needs to account for, and ultimately improving the reliability of the final representation 124, since the programmatic component 122 is better in solving deterministic subtasks than creative ones, while the LLM 110 is better at solving creative subtasks than deterministic ones. Thus, during the design of the system 100, a programmer/user/administrator may determine which features need not be used in the LLM portion of the generation process and may design the programmatic component 122 to perform those features.

The prompt for the intermediate representation 120 may look like this:

create a CDS Model for authors and books.

```
You are a domain modeling expert, create a domain model for authors and
books following the JSON schema.
"'json_schema
{
  "description": "the domain model",
  "type": "object",
  "properties": {
    "namespace": {
      "type": "string"
    },
    "entities": {
      "type": "array",
      "items": {
        "type": "object",
        "properties": {
          "name": {
            "type": "string"
          },
          "elements": {
            "type": "array",
            "items": {
              "type": "object",
              "properties": {
                "name": {
                  "type": "string"
                },
                "type": {
                  "description": "possible values:
UUID,Boolean,Integer,Decimal(precision,
scale),Double,Date,Time,DateTime,Timestamp,String(length)",
                  "type": "string"
                }
              },
              "required": ["name", "type"]
            }
          }
          "associations": {
            "type": "array",
            "items": {
              "type": "object",
              "properties": {
                "name": {
                  "type": "string"
                },
                "target": {
                  "type": "string"
                },
                "multiplicity": {
                  "type": "string"
                },
                "selfContained": {
                  "type": "boolean"
                },
                "backlink": {
                  "description": "must point to existing association of target",
```

-continued

```
                    "type": "string"
                  }
                },
                "required": ["name", "target", "multiplicity", "selfContained"]
              }
            }
          },
          "required": ["name", "elements", "associations"]
        }
      }
    },
    "required": ["namespace", "entities"]
}
```
Based on this schema, generate the JSON object, do not output any text, just the JSON, format:
```json
{{generated JSON}}
```

The LLM may then generate a JSON object based on that prompt.

As mentioned earlier, an implementation using JSON as the intermediate representation format and CDS as the final representation format is only one example of a combination of intermediate and final representation formats that the above-described techniques can be used for. Unless otherwise indicated, the scope of the claims shall not be limited to JSON and CDS implementations. In example embodiments, the intermediate representation format may be any format that is not compilable but is still descriptive of computer code, while the final representation format may be any format that is compilable computer code.

It should be noted that while the generation of intermediate representations are discussed in detail in this disclosure, embodiments are foreseen where intermediate representations are not generated and instead the LLM generates the final representation directly (once the multi-round question generation and answering have been completed). For example, in application development normally there is a need to create configuration files, such as configuration files in the Yet Another Markup Language (YAML) format. It can be tedious to come up with these files by hand, especially since the user does not even know which properties are available. The user may know semantically what needs to be in there, but it is far more efficient for the user to simply be prompted to answer questions about what is needed rather than having to come up with the substantive properties to include on their own.

It should also be noted that there is no requirement that the final representation be compilable computer code. The same techniques can be used to generate any text. The main point is that the LLM understand the text and thus is able to figure out what is required and missing.

Figure 2:
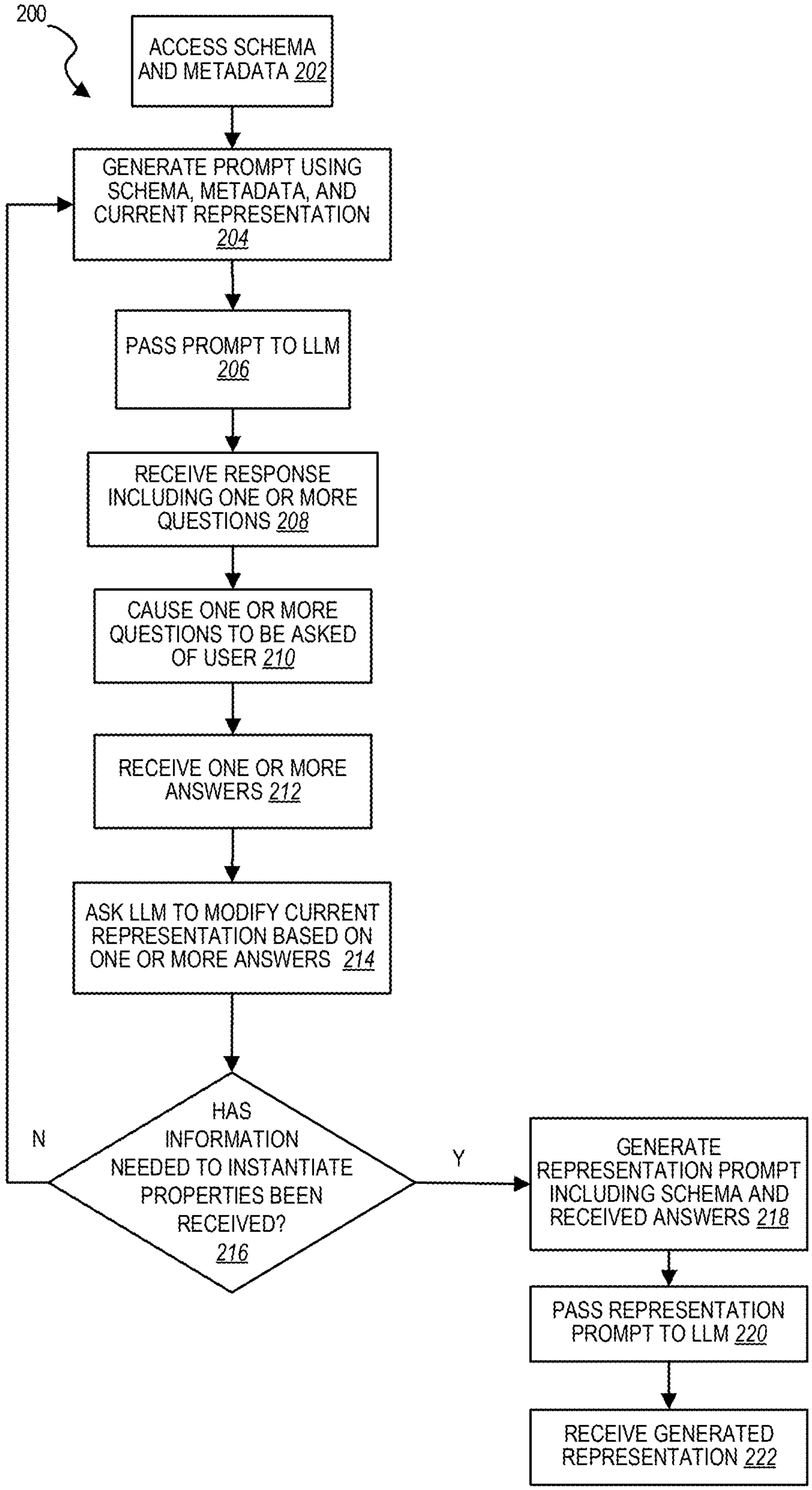
FIG. 2 is a flow diagram illustrating a method for automatically generating a representation by an LLM, in accordance with an example embodiment.

FIG. 2 is a flow diagram illustrating a method 200 for automatically generating a representation by an LLM, in accordance with an example embodiment. At operation 202, a schema and metadata for the schema are accessed. At operation 204, a prompt is generated using the schema, metadata, and current representation. Initially the current representation is empty, but in subsequent iterations it will not be. At operation 206, the prompt is passed to the LLM.

At operation 208, a generated response is received from the LLM, including one or more questions. At operation 210, the one or more questions are caused to be asked of a user. At operation 212, one or more answers are received.

At operation 214, the current representation is modified based on the one or more answers. At operation 216, it is determined if information needed to instantiate the properties been received. If not, then the method 200 loops back to operation 204. If so, however, then at operation 218 a representation prompt is generated including the schema and the received answers. At operation 220, the representation prompt is passed to the LLM. At operation 222, a generated representation is received from the LLM.

Optionally, at this point, the generated representation can be an intermediate representation that is passed to a programmatic component to create a final representation.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing a schema and metadata about the schema, the schema defining a plurality of properties, the metadata comprising, for each property of the plurality of properties, a type of information to generate an instance of a corresponding property; generating a prompt using the schema and the metadata; passing the prompt to a large language model (LLM); receiving a response from the LLM, the response comprising one or more questions; causing the one or more questions from the response to be asked to a user; receiving one or more answers to the one or more questions; generating another prompt using the schema, the metadata, and the one or more answers; passing the another prompt to the LLM; repeating the receiving a response, causing, receiving one or more answers, generating another prompt, and generating the another prompt until, for each property of the plurality of properties, the corresponding type of information to generate an instance of the corresponding property has been received; generating a representation prompt comprising the schema and the received answers; passing the representation prompt to the LLM; and receiving, from the LLM, a generated representation in response to the representation prompt.

In Example 2, the subject matter of Example 1 comprises, wherein the generated representation is an intermediate representation, and wherein the operations further comprise: passing the generated intermediate representation to a programmatic component, which validates the generated intermediate representation and converts the generated intermediate representation into a final representation, the final representation being compilable computer code.

In Example 3, the subject matter of Example 2 comprises, wherein the compilable computer code is in a format that is at least partially proprietary.

In Example 4, the subject matter of Example 3 comprises, wherein the compilable computer code is a Core Data Services (CDS) model.

In Example 5, the subject matter of Examples 1-4 comprises, wherein the metadata comprises a priority level for one or more properties, the priority level indicating importance of obtaining the type of information needed to generate the instance of the corresponding property.

In Example 6, the subject matter of Examples 1-5 comprises, wherein the metadata comprises a question group for at least two of the properties, the question group indicating a grouping of the at least two of the properties such that the LLM generates, in a single response, one or more questions for obtaining answers having information needed to generate the instances of the corresponding at least two of the properties.

In Example 7, the subject matter of Example 6 comprises, wherein the metadata comprises, for the at least two of the properties in the question group, an ordering indicating in which questions corresponding to the at least two of the properties should be generated by the LLM.

In Example 8, the subject matter of Examples 1-7 comprises, wherein the metadata comprises an indication of whether a first property is mandatory, indicating whether the LLM needs to generate one or more questions for obtaining an answer having information needed to generate the instance of the first property.

In Example 9, the subject matter of Examples 1-8 comprises, wherein the response comprises a function call to a user interface function describing how to present the one or more questions to the user.

Example 10 is a method comprising: accessing a schema and metadata about the schema, the schema defining a plurality of properties, the metadata comprising, for each property of the plurality of properties, a type of information to generate an instance of a corresponding property; generating a prompt using the schema and the metadata; passing the prompt to a large language model (LLM); receiving a response from the LLM, the response comprising one or more questions; causing the one or more questions from the response to be asked to a user; receiving one or more answers to the one or more questions; generating another prompt using the schema, the metadata, and the one or more answers; passing the another prompt to the LLM; repeating the receiving a response, causing, receiving one or more answers, generating another prompt, and generating the another prompt until, for each property of the plurality of properties, the corresponding type of information to generate an instance of the corresponding property has been received; generating a representation prompt comprising the schema and the received answers; passing the representation prompt to the LLM; and receiving, from the LLM, a generated representation in response to the representation prompt.

In Example 11, the subject matter of Example 10 comprises, wherein the generated representation is an intermediate representation, and wherein the method further comprises: passing the generated intermediate representation to a programmatic component, which validates the generated intermediate representation and converts the generated intermediate representation into a final representation, the final representation being compilable computer code.

In Example 12, the subject matter of Example 11 comprises, wherein the compilable computer code is in a format that is at least partially proprietary.

In Example 13, the subject matter of Examples 10-12 comprises, wherein the metadata comprises a priority level for one or more properties, the priority level indicating importance of obtaining the type of information needed to generate the instance of the corresponding property.

In Example 14, the subject matter of Examples 10-13 comprises, wherein the metadata comprises a question group for at least two of the properties, the question group indicating a grouping of the at least two of the properties such that the LLM generates, in a single response, one or more questions for obtaining answers having information needed to generate the instances of the corresponding at least two of the properties.

In Example 15, the subject matter of Example 14 comprises, wherein the metadata comprises, for the at least two of the properties in the question group, an ordering indicating in which questions corresponding to the at least two of the properties should be generated by the LLM.

In Example 16, the subject matter of Examples 10-15 comprises, wherein the metadata comprises an indication of whether a first property is mandatory, indicating whether the LLM needs to generate one or more questions for obtaining an answer having information needed to generate the instance of the first property.

In Example 17, the subject matter of Examples 10-16 comprises, wherein the response comprises a function call to a user interface function describing how to present the one or more questions to the user.

Example 18 is a non-transitory machine-readable medium storing instructions which, when executed by one or more processors, cause the one or more processors to perform operations comprising: accessing a schema and metadata about the schema, the schema defining a plurality of properties, the metadata comprising, for each property of the plurality of properties, a type of information to generate an instance of a corresponding property; generating a prompt using the schema and the metadata; passing the prompt to a large language model (LLM); receiving a response from the LLM, the response comprising one or more questions; causing the one or more questions from the response to be asked to a user; receiving one or more answers to the one or more questions; generating another prompt using the schema, the metadata, and the one or more answers; passing the another prompt to the LLM; repeating the receiving a response, causing, receiving one or more answers, generating another prompt, and generating the another prompt until, for each property of the plurality of properties, the corresponding type of information to generate an instance of the corresponding property has been received; generating a representation prompt comprising the schema and the received answers; passing the representation prompt to the LLM; and receiving, from the LLM, a generated representation in response to the representation prompt.

In Example 19, the subject matter of Example 18 comprises, wherein the generated representation is an intermediate representation, and wherein the operations further comprise: passing the generated intermediate representation to a programmatic component, which validates the generated intermediate representation and converts the generated intermediate representation into a final representation, the final representation being compilable computer code.

In Example 20, the subject matter of Example 19 comprises, wherein the compilable computer code is in a format that is at least partially proprietary.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
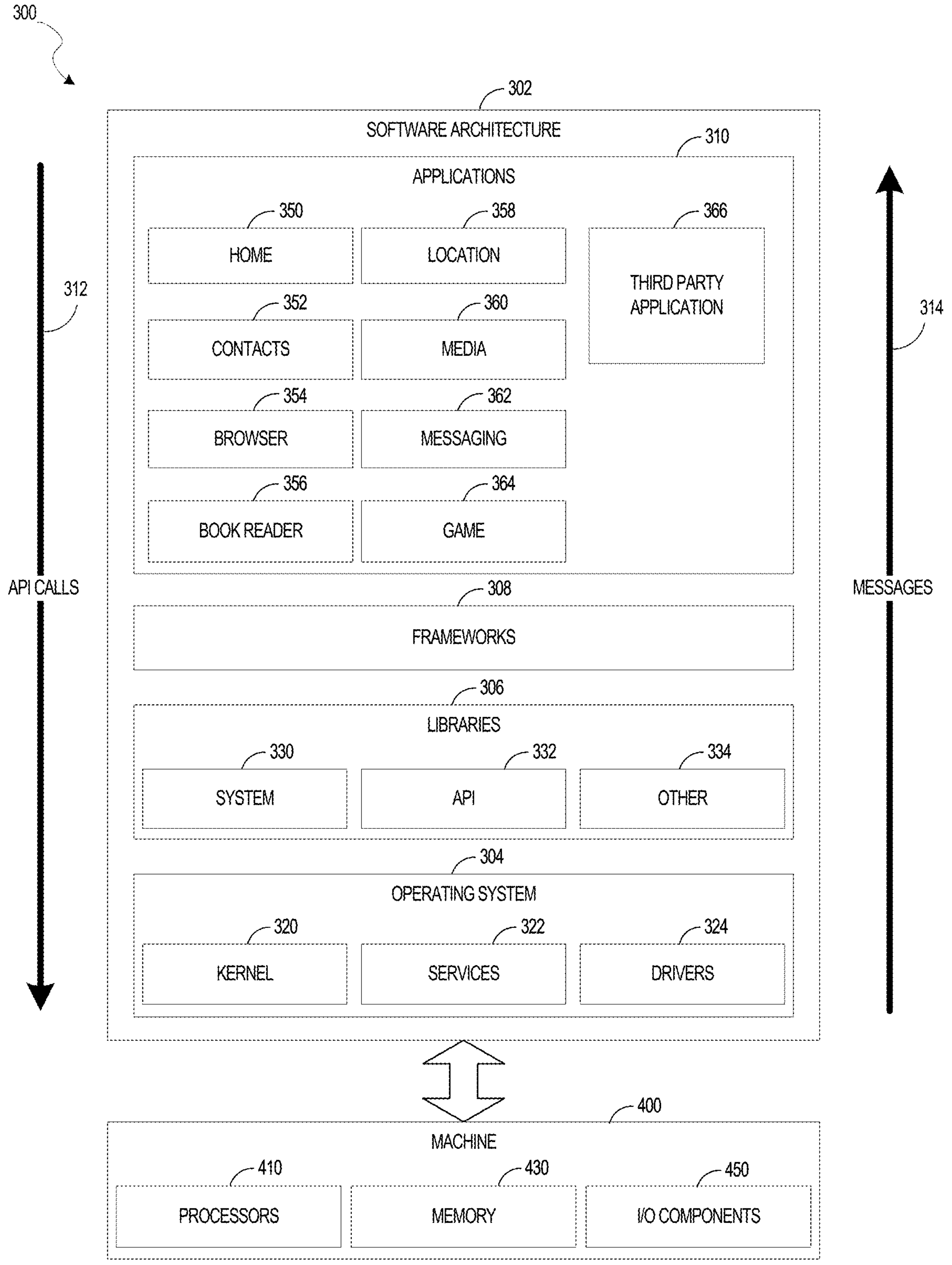
FIG. 3 is a block diagram illustrating an architecture of software, which can be installed on any one or more devices.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 and send messages 314 to facilitate functionality described herein.

Figure 4:
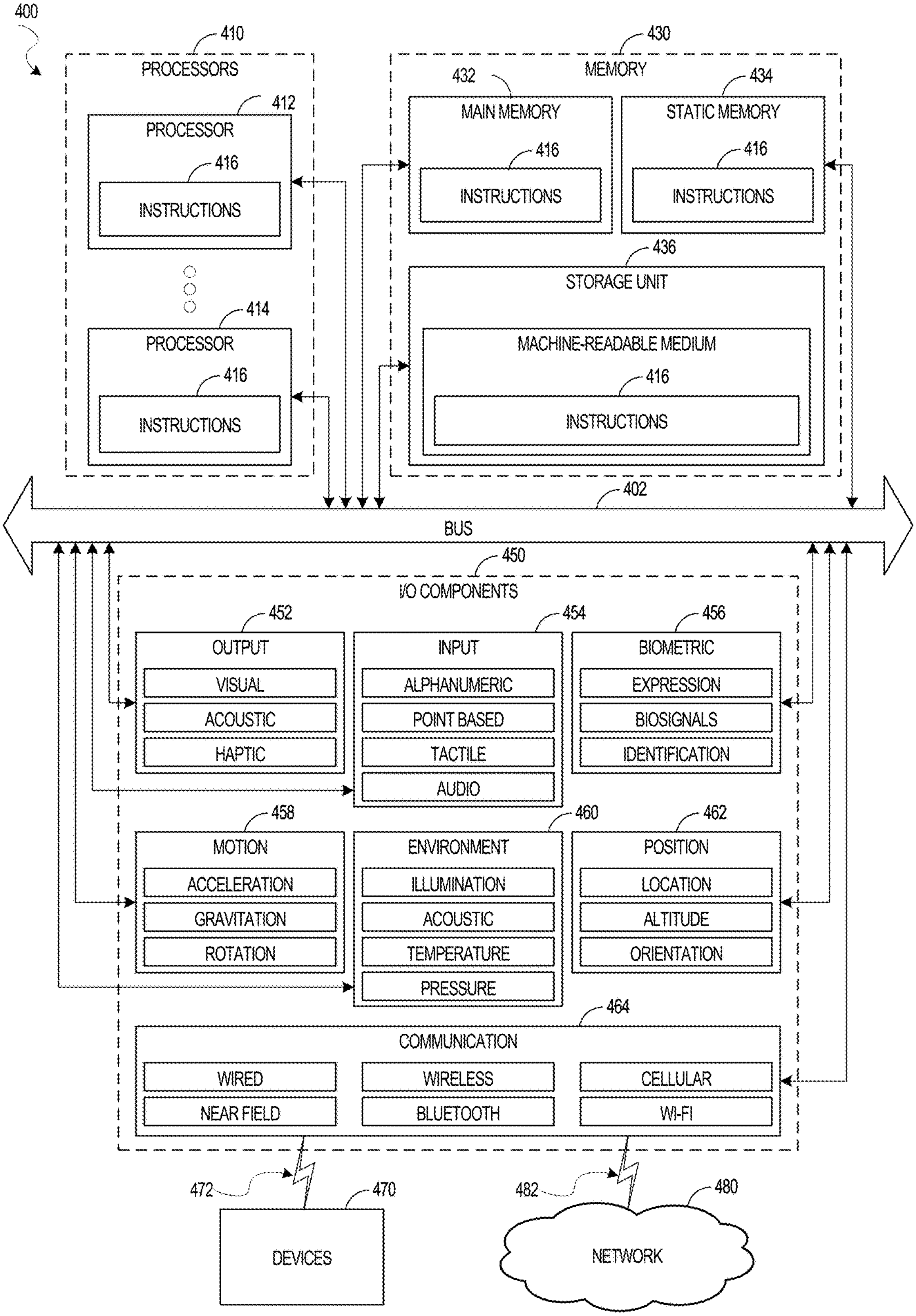
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing a schema and metadata about the schema, the schema defining a plurality of properties, the metadata comprising, for each property of the plurality of properties, a type of information to generate an instance of a corresponding property;

generating a prompt using the schema and the metadata;

passing the prompt to a large language model (LLM);

receiving a response from the LLM, the response comprising one or more questions;

causing the one or more questions from the response to be presented to a user;

receiving one or more answers to the one or more questions;

generating another prompt using the schema, the metadata, and the one or more answers;

passing the another prompt to the LLM;

repeating the receiving a response, causing, receiving one or more answers, generating another prompt, and generating the another prompt until, for each property of the plurality of properties, the corresponding type of information to generate an instance of the corresponding property has been received;

generating a representation prompt comprising the schema and the received answers;

passing the representation prompt to the LLM; and receiving, from the LLM, a generated representation in response to the representation prompt.

2. The system of claim 1, wherein the generated representation is an intermediate representation, and wherein the operations further comprise:

passing the generated intermediate representation to a programmatic component, which validates the generated intermediate representation and converts the generated intermediate representation into a final representation, the final representation being compilable computer code.

3. The system of claim 2, wherein the compilable computer code is in a format that is at least partially proprietary.

4. The system of claim 3, wherein the compilable computer code is a Core Data Services (CDS) model.

5. The system of claim 1, wherein the metadata comprises a priority level for one or more properties, the priority level indicating importance of obtaining the type of information needed to generate the instance of the corresponding property.

6. The system of claim 1, wherein the metadata comprises a question group for at least two of the properties, the question group indicating a grouping of the at least two of the properties such that the LLM generates, in a single response, one or more questions for obtaining answers having information needed to generate the instances of the corresponding at least two of the properties.

7. The system of claim 6, wherein the metadata comprises, for the at least two of the properties in the question group, an ordering indicating in which questions corresponding to the at least two of the properties should be generated by the LLM.

8. The system of claim 1, wherein the metadata comprises an indication of whether a first property is mandatory, indicating whether the LLM needs to generate one or more questions for obtaining an answer having information needed to generate the instance of the first property.

9. The system of claim 1, wherein the response comprises a function call to a user interface function describing how to present the one or more questions to the user.

10. A method comprising:

accessing a schema and metadata about the schema, the schema defining a plurality of properties, the metadata comprising, for each property of the plurality of properties, a type of information to generate an instance of a corresponding property;

generating a prompt using the schema and the metadata;

passing the prompt to a large language model (LLM);

receiving a response from the LLM, the response comprising one or more questions;

causing the one or more questions from the response to be asked to a user;

receiving one or more answers to the one or more questions;

generating another prompt using the schema, the metadata, and the one or more answers;

passing the another prompt to the LLM;

repeating the receiving a response, causing, receiving one or more answers, generating another prompt, and generating the another prompt until, for each property of the plurality of properties, the corresponding type of information to generate an instance of the corresponding property has been received;

generating a representation prompt comprising the schema and the received answers;

passing the representation prompt to the LLM; and receiving, from the LLM, a generated representation in response to the representation prompt.

11. The method of claim 10, wherein the generated representation is an intermediate representation, and wherein the method further comprises:

passing the generated intermediate representation to a programmatic component, which validates the generated intermediate representation and converts the generated intermediate representation into a final representation, the final representation being compilable computer code.

12. The method of claim 11, wherein the compilable computer code is in a format that is at least partially proprietary.

13. The method of claim 10, wherein the metadata comprises a priority level for one or more properties, the priority level indicating importance of obtaining the type of information needed to generate the instance of the corresponding property.

14. The method of claim 10, wherein the metadata comprises a question group for at least two of the properties, the question group indicating a grouping of the at least two of the properties such that the LLM generates, in a single response, one or more questions for obtaining answers having information needed to generate the instances of the corresponding at least two of the properties.

15. The method of claim 14, wherein the metadata comprises, for the at least two of the properties in the question group, an ordering indicating in which questions corresponding to the at least two of the properties should be generated by the LLM.

16. The method of claim 10, wherein the metadata comprises an indication of whether a first property is mandatory, indicating whether the LLM needs to generate one or more questions for obtaining an answer having information needed to generate the instance of the first property.

17. The method of claim 10, wherein the response comprises a function call to a user interface function describing how to present the one or more questions to the user.

18. A non-transitory machine-readable medium storing instructions which, when executed by one or more processors, cause the one or more processors to perform operations comprising:

accessing a schema and metadata about the schema, the schema defining a plurality of properties, the metadata comprising, for each property of the plurality of properties, a type of information to generate an instance of a corresponding property;

generating a prompt using the schema and the metadata;

passing the prompt to a large language model (LLM);

receiving a response from the LLM, the response comprising one or more questions;

causing the one or more questions from the response to be asked to a user;

receiving one or more answers to the one or more questions;

generating another prompt using the schema, the metadata, and the one or more answers;

passing the another prompt to the LLM;

repeating the receiving a response, causing, receiving one or more answers, generating another prompt, and generating the another prompt until, for each property of the plurality of properties, the corresponding type of information to generate an instance of the corresponding property has been received;

generating a representation prompt comprising the schema and the received answers;

passing the representation prompt to the LLM; and receiving, from the LLM, a generated representation in response to the representation prompt.

19. The non-transitory machine-readable medium of claim 18, wherein the generated representation is an intermediate representation, and wherein the operations further comprise:

passing the generated intermediate representation to a programmatic component, which validates the generated intermediate representation and converts the generated intermediate representation into a final representation, the final representation being compilable computer code.

20. The non-transitory machine-readable medium of claim 19, wherein the compilable computer code is in a format that is at least partially proprietary.

* * * * *